United States Patent [19]

Holtermann et al.

[11] 4,337,054
[45] Jun. 29, 1982

[54] OUTBOARD MOTOR INCLUDING FOLDED TUNED EXHAUST GAS PASSAGE

[75] Inventors: Theodore J. Holtermann, Milwaukee; Otto H. Scharpf, Brookfield, both of Wis.

[73] Assignee: Outboard Marine Corporation, Waukegan, Ill.

[21] Appl. No.: 131,117

[22] Filed: Mar. 17, 1980

[51] Int. Cl.³ .......................................... B63H 21/26
[52] U.S. Cl. ...................................... 440/89; 60/312; 123/65 E
[58] Field of Search ........................ 60/312, 313, 314; 440/89; 123/65 E

[56] References Cited

U.S. PATENT DOCUMENTS

| | | | |
|---|---|---|---|
| 1,804,321 | 5/1931 | Crowe | 60/314 |
| 2,102,559 | 12/1937 | Kadenacy | 60/314 |
| 2,542,756 | 2/1951 | Draminsky | 60/314 |
| 3,385,052 | 5/1968 | Holtermann et al. | 60/314 |
| 3,462,947 | 8/1969 | Nowak | 60/314 |
| 3,520,270 | 7/1970 | Miller | 440/89 |
| 3,665,712 | 5/1972 | Tenney | 60/314 |
| 3,695,238 | 10/1972 | Boerma | 123/65 E |
| 3,703,937 | 11/1972 | Tenney | 60/314 X |
| 3,842,599 | 10/1974 | Ehlen | 60/314 X |
| 3,967,446 | 7/1976 | Harralson et al. | 60/312 |

FOREIGN PATENT DOCUMENTS 1511037  5/1978  United Kingdom .

*Primary Examiner*—Sherman D. Basinger
*Attorney, Agent, or Firm*—Michael, Best & Friedrich

[57] ABSTRACT

The invention includes an outboard motor comprising a power head having an exhaust gas port, a drive shaft housing extending downwardly from the power head and including an exhaust gas discharge outlet adjacent its lower end, and a continuous folded passage housed in the drive shaft housing. The folded passage includes a first passage portion having an upper end communicating with the exhaust gas port a second portion extending upwardly from the lower end of the first portion and having an upper end, and a third portion communicating with the upper end of the second portion. The folded passage functions to return to the exhaust port as positive pressure pulses the pressure pulses emitted by the exhaust ports, the folded passage causing return of the pressure pulses in timed relation with respect to closing of the exhaust port to thereby facilitate precompression of the fuel mixture entering the cylinder.

18 Claims, 10 Drawing Figures

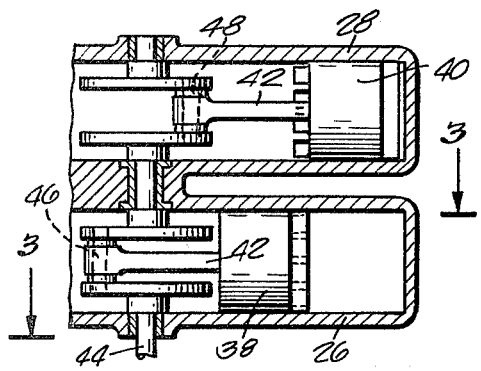
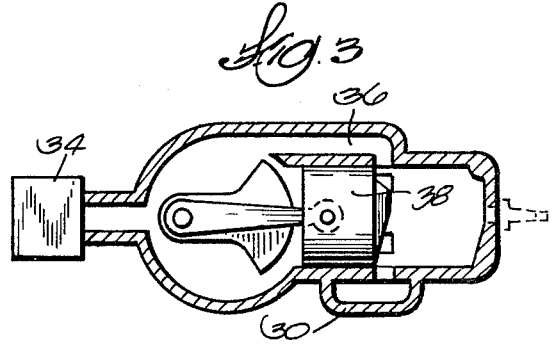
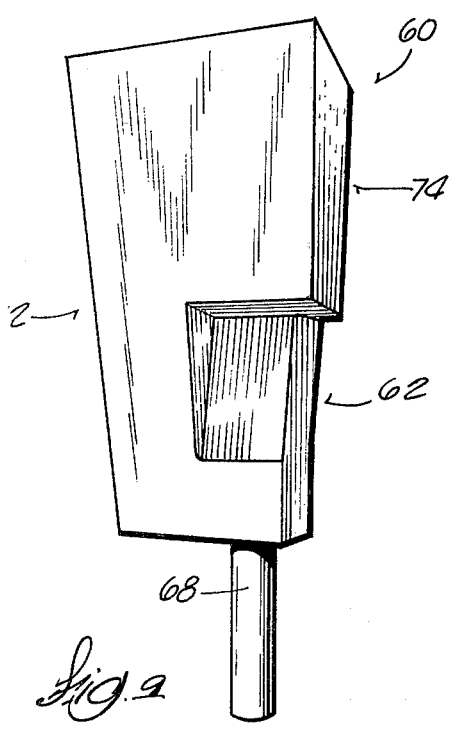
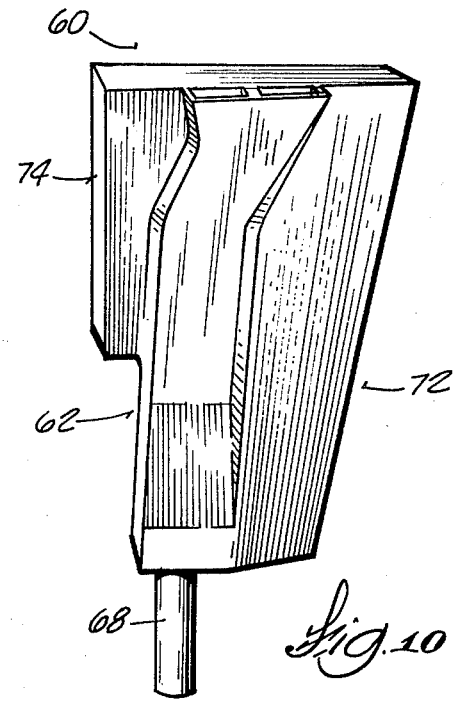

OUTBOARD MOTOR INCLUDING FOLDED TUNED EXHAUST GAS PASSAGE

FIELD OF THE INVENTION

The invention relates to outboard motors and to tuned exhaust systems for outboard motors wherein a folded passage is housed in the propulsion leg of the motor and provides means for reflection of exhaust gas pressure pulses back to the exhaust ports of the engine in timed relation with respect to opening of the exhaust ports to thereby increase the engine efficiency.

BACKGROUND PRIOR ART

An example of a prior art tuned exhaust system embodied in an outboard motor is illustrated in the U.S. Miller Pat. No. 3,520,270, issued July 14, 1970. Attention is also directed to the U.S. Boerma Pat. No. 3,695,238, issued Oct. 3, 1972 and the U.S. Holtermann et al. Pat. No. 3,385,052, issued May 28, 1968.

Other patents of interest include the U.S. Kadenacy Pat. No. 2,102,559, issued Dec. 14, 1937; the U.S. Crowe Pat. No. 1,804,321, issued May 5, 1931; the U.S. Harralson et al. Pat. No. 3,967,446, issued July 6, 1976; and the U.S. Ehlan Pat. No. 3,842,599, issued Oct. 22, 1974.

Attention is further directed to the U.S. Draminsky Pat. No. 2,542,756, issued Feb. 20, 1951; the U.S. Nowak Pat. No. 3,462,947, issued Aug. 26, 1969; the U.S. Tenney Pat. No. 3,665,712, issued May 30, 1972; and the U.S. Tenney Pat. No. 3,703,937, issued Nov. 28, 1972.

SUMMARY OF THE INVENTION

The invention includes an outboard motor comprising a power head including an engine and having an exhaust gas port, a drive shaft housing extending downwardly from the power head and including a lower end, a drive shaft driven by the engine, an exhaust gas discharge outlet adjacent the lower edge of the drive shaft housing, and means defining a continuous folded passage housed in the drive shaft housing. The continuous folded passage includes a first passage portion having an upper end communicating with the exhaust gas port, a second portion extending upwardly from the lower end of the first portion and having an upper end, and a third portion communicating with the upper end of the second portion. The folded passage also communicates with the exhaust gas discharge outlet. The outboard motor also includes a propeller supported for rotation by the lower end of the drive shaft housing and drivingly connected to the drive shaft.

The invention also includes an outboard motor comprising a power head including an engine block, a piston reciprocably movably carried in the block, a cylinder head carried on the block and defining in conjunction with the piston a combustion chamber, an exhaust port communicating with the combustion chamber and being disposed to be closed by the piston. The outboard motor also includes a lower unit extending downwardly from the power head and including a lower end adapted to support a propeller, an exhaust gas discharge outlet adjacent the lower end of the lower unit, and means defining a folded passage housed in the lower unit. The means defining the folded passage includes means for returning to the exhaust port, as pressure pulses, the exhaust gas pressure pulses traveling in the folded passage and for causing a return of the pressure pulses in relation to the closing of the exhaust port to afford arrival of the pressure pulses at the exhaust port prior to the closing of the exhaust port by the piston. The folded passage includes a first portion having an upper end communicating with the exhaust gas port and a lower end communicating with the exhaust gas discharge outlet, a second portion communicating with the lower end of the first portion and having an upper end, and a third portion communicating with the upper end of the second portion, the third portion terminating in an end wall.

One of the features of the invention is the provision in the first passage portion of a lower end section having an increasing cross sectional area in the direction away from the exhaust port and the provision in the second passage portion of an increasing cross sectional area in the direction toward the second portion upper end whereby the first portion lower end and the second portion form a passage segment which has a cross section which substantially continuously increases as the distance from the exhaust port increases, and the provision in the third portion of a decreasing cross sectional area in the direction toward the end wall.

Various other features and advantages of the invention are set forth in the following description of a preferred embodiment, in the claims, and in the drawings.

BRIEF DESCRIPTION OF THE DRAWINGS

FIG. 2 is an enlarged partial cross section elevation view of an engine of the outboard motor in FIG. 1.

FIG. 3 is an enlarged cross section view taken along line 3—3 in FIG. 1.

FIGS. 9 and 10 are perspective views of the exhaust expansion chamber shown in FIG. 4.

Figure 1:
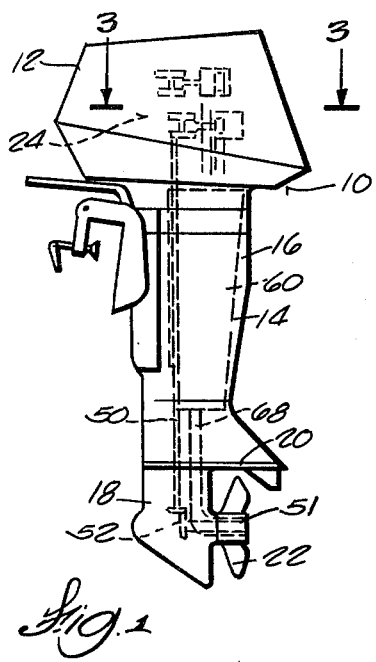
FIG. 1 is a side elevation view of an outboard motor embodying the invention.

Before explaining at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

In the drawings, FIG. 1 shows an outboard motor 10 including a power head 12 and a lower unit 14, the lower unit supporting the power head 12 and including an intermediate drive shaft housing 16 connected to the power head 12. The lower unit 14 also includes a gear box 18 which is located at the lower end of the drive shaft housing. An antiventilation plate 20 is located in a conventional location above the gear box 18. Under normal operating conditions the antiventilation plate 20 is located at or slightly below the water level. The outboard motor 10 also includes a propeller 22 rotatably mounted on the lower end of the lower unit 14 and rearwardly of the gear box 18.

Figure 4:
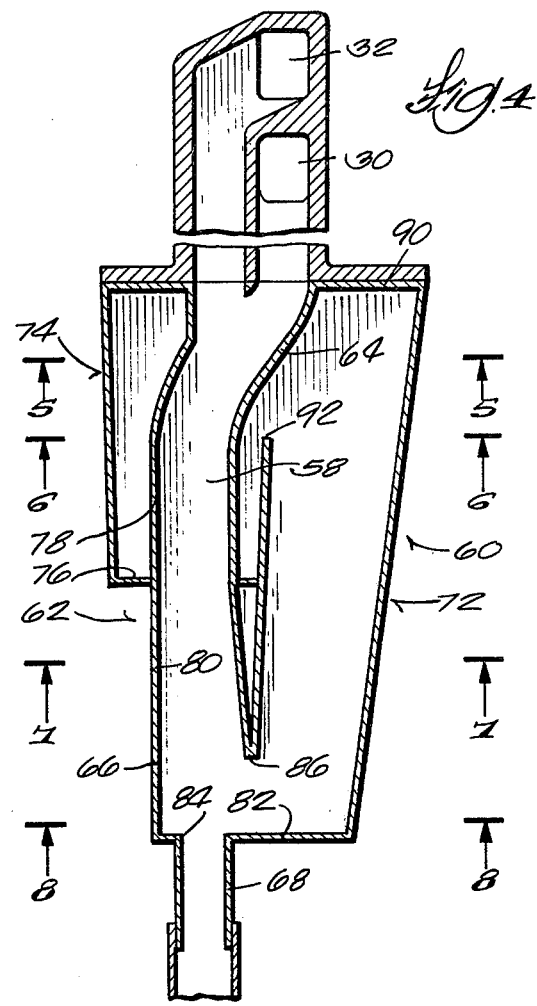
FIG. 4 is an enlarged cross section elevation view of a folded exhaust gas passage embodied in the outboard motor of FIG. 1.
Figure 5:
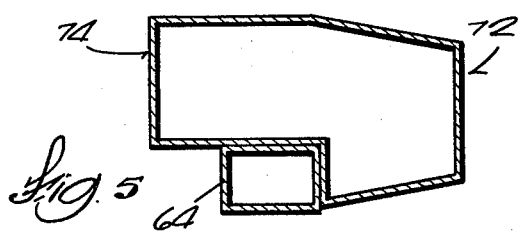
FIG. 5 is a cross section view taken along line 5—5 in FIG. 4.
Figure 6:
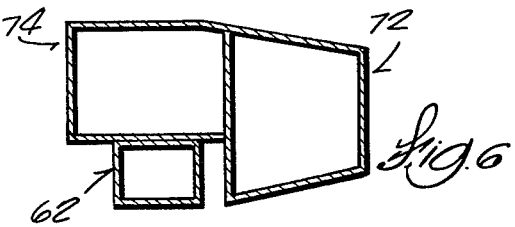
FIG. 6 is a cross section view taken along line 6—6 in FIG. 4.
Figure 7:
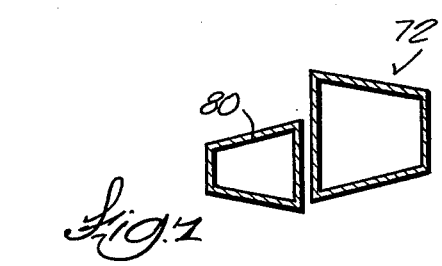
FIG. 7 is a cross section view taken along line 7—7 in FIG. 4.
Figure 8:
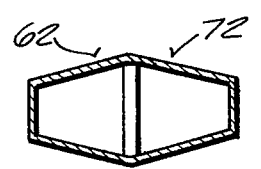
FIG. 8 is a cross section view taken along line 8—8 in FIG. 4.

The power head 12 is shown as including a conventional two-cycle internal combustion engine 24 which includes first and second cylinders, 26 and 28 respectively, (FIGS. 2 and 3) provided with first and second exhaust ports 30 and 32, respectively (FIG. 4). The engine also includes a crank case fuel-air inlet port 34 and a transfer passage 36 for each cylinder. The engine 24 also includes first and second pistons 38 and 40, respectively, which are reciprocally disposed in the cylinders 26 and 28 and connected by connecting rods 42 to a crankshaft 44 having crank pins 46 and 48 which are angularly offset at 180°. The crankshaft 44 is drivingly connected to a drive shaft 50 (FIG. 1) extending downwardly through the lower unit 14 and driving the propeller shaft 51 and the propeller 22 through gears 52 housed in the gear box 18. In operation of the engine 24, the exhaust ports 30 and 32 are uncovered near the bottom of the power stroke and the ports are closed immediately after initiation of the compression stroke.

Means are provided for defining a folded expansion chamber or passage 58 housed within the drive shaft housing 14, the folded passage 58 communicating with the exhaust ports 30 and 32 and functioning as a tuned passage for reflecting exhaust gas positive pressure pulses, formed at the exhaust ports 30 and 32 and emitted into the folded passage as the exhaust ports open, back to the exhaust ports immediately prior to the compression stroke of the engine to thereby increase the compression of the fuel-air mixture in the combustion chamber, and for returning rarefaction waves to the engine exhaust ports during the scavenging period to facilitate engine scavenging and increased efficiency.

When the exhaust port of a cylinder is uncovered during a power stroke, positive pressure pulses are created at the exhaust port and these pressure pulses travel at a speed approximating the speed of sound. During the time interval commencing when an exhaust port is opened by the piston on the power stroke thereby creating the pressure pulses, and just prior to closing of the same exhaust port by the piston as the piston travels toward the cylinder head on the compression stroke, the pressure pulse can be reflected and returned to the exhaust port of the originating cylinder to cause precompression of the fuel mixture in the combustion chamber. Such reflection of the pressure pulse can be provided by employment of a chamber or passage for receiving the pressure pulse, the passage having a length adapted to provide the desired synchronization of the reflection of the pressure pulses with the movement of the pistons at a preselected engine r.p.m.

The means for defining the folded passage is best illustrated in FIG. 4 and comprises an exhaust housing structure 60 housed in the drive shaft housing 16 of the lower unit 14 and generally including a first passage portion 62 extending downwardly and having an upper end 64 adapted to receive the exhaust gases emitted by the exhaust ports 30 and 32 and a lower end 66 communicating with an exhaust outlet pipe 68 providing for exhaust flow downwardly through the lower unit 14 whereby it is exhausted through the propeller hub 70 as is conventional. The folded passage 58 also includes a second portion 72 communicating with the first passage portion and extending upwardly, and a downwardly extending third passage portion 74 communicating with the upper end of the second passage portion 72 and terminating in a transverse end wall 76. The three portions 62, 72 and 74 of the folded passage 58 are joined in such a manner as to form a generally continuous passage of sufficient length to provide for propagation of a positive pressure wave from the exhaust ports 30 and 32 to the transverse end wall 76 of the third portion 74 and back to the exhaust ports 30 and 32 in timed relationship with the opening and closing of the exhaust ports when the engine is operating at an r.p.m. where maximum efficiency is desired.

The upper end 64 of the first passage portion 62 is adapted to communicate with both of the exhaust ports 30 and 32 and to channel the exhaust emitted from the exhaust ports to a a relatively straight section 78 intermediate the opposite ends of the first passage portion. The first passage portion 62 also includes a flaired or expansion section 80 at its lower end. The expansion section 80 increases in cross sectional area in the direction away from the exhaust ports and while the first passage portion is quadrilateral in cross section, as shown in FIGS. 5–8, the increase in cross sectional area is equivalent to that of a cone expanding in cross sectional area at a rate of 6° to 8°. The lower end of the first passage portion 62 terminates in a transverse end wall 82 generally perpendicular to the direction of exhaust flow and to that of the pressure pulse propagation. The transverse end wall 82 includes an opening 84 therethrough communicating with the exhaust conduit 68.

The second passage portion 72 has a lower end which communicates through an opening 86 with the lower end of the first passage portion 62. The lower end of the second passage has a cross sectional area substantially the same as that of the lower end of the first passage and the opening 86 therebetween also has a cross sectional area substantially equal to the cross sectional areas of the lower ends of the first and second passages such that the passage formed by the lower end of the first passage portion, the opening 86, and the lower end of the second passage portion approximates a continuously increasing cross section. The second passage 72 extends upwardly from the transverse end wall 82 and includes a generally continually increasing cross sectional area in the direction away from the transverse end wall. In the illustrated construction, the second passage portion has an increasing cross sectional area equivalent to that of a cone increasing in cross sectional area at an angle of approximately 9.6°. The upper end of the second passage portion terminates in an upper transverse end wall 90 generally parallel to the lower transverse end wall 82.

The folded passage 58 also includes a third portion 74 having an upper end communicating with the upper end of the second passage portion 72 through an opening 92. As with the opening 86 between the lower end of the first passage portion 62 and the lower end of the second passage portion 72, the opening 92 between the second and third passage portions has a cross sectional area approximately equal to that of the upper end of the second passage portion 72 and that of the upper end of the third passage portion 74. The third passage portion 74 extends downwardly from the upper transverse end wall 90 and terminates in the transverse end wall 76 shown as being intermediate the upper and lower transverse end walls 82 and 90 respectively and parallel to those end walls. In alternative forms of the invention the third passage could be shorter in length such that the end wall 76 would be positioned closer to the end wall 90. Unlike the first and second passage portions, the lower end of the third portion 74 converges in cross section in the direction toward the transverse end wall 76. Such convergence of the third passage portion 74 causes initiation of reflection of the positive pressure pulses emitted by the exhaust ports 30 and 32 as the pressure pulses enter the third passage portion 74 and propagate toward the transverse end wall 76.

In operation of the embodiment shown, as the piston 38 uncovers the exhaust port 30 on the power stroke as shown in FIG. 3, a sharp positive pulse is generated in the upper end 64 of the first passage portion 62 and propagates at a speed approximating the speed of sound. Though the exhaust passage 58 is folded, for purposes of propagation of the pressure pulses, it functions in the same manner as a straight length, and the pressure pulse travels successively through the first passage portion 62, the second passage portion 72 and is reflected by the constriction in the third passage portion 74 and by the transverse end wall 76. If the engine is operating at the preselected r.p.m., the reflected pressure pulse returns to the exhaust port 30 just prior to the closing of the exhaust port by the piston 38 on the compression stroke. The presence of the pressure pulse at the exhaust port 30 during closing of the port by the piston increases the pressure in the cylinder, thereby increasing the compression of the fuel-air mixture prior to combustion to thus increase the efficiency and power output of the cylinder.

One of the advantages of the invention is that the pressure pulses reflected back to the exhaust ports 30 and 32 are caused to impinge against the exhaust ports for a sufficient length of time so as to provide for precompression of the gases in the cylinder for the required duration. Maintenance of a pressure at the exhaust port for the desired predetermined time period is occasioned by the provision of the decrease in the cross sectional area of that portion of the passage adjacent the transverse end wall 76 whereby an extended passage portion is provided for reflecting the positive pressure pulses.

The construction of the folded passage 58 also provides for the return of rarefaction waves to the exhaust ports 30 and 32 in timed relation with respect to the opening of the exhaust ports to thereby improve scavenging of the exhaust gases from engine. The return of the rarefaction waves is accomplished through the provison of a continuously increasing cross section area portion of the folded passage 58, that portion being comprised of the lower section 80 of the first passage portion 62 and the second passage portion 72. In operation, as the pressure pulse emitted by the exhaust port encounters the increasing cross section area 80, a rarefaction wave or a negative pressure wave is returned to the exhaust port. The dwell of the reflected negative pressure wave at the exhaust port is dependent on the length of the continuously increasing area portion of the folded passage 58. One of the advantages of the illustrated construction is that when the engine is operating at the preselected r.p.m., the portion of the folded exhaust passage 58 having a substantially continuously increasing cross sectional area is so positioned as to cause arrival of the rarefaction waves at the desired point in time with respect to the opening of the exhaust port and has a suitable length as to cause a dwell of that negative pressure wave at the exhaust port so as to achieve maximum scavenging of exhaust from the combustion chamber.

While the invention is illustrated as being incorporated in an outboard motor having two cylinders, it should be readily understood that the invention is also equally useful in outboard motors having a single cylinder or having more than two cylinders. Additionally, while the exhaust outlet 68 is shown as extending downwardly from the end of the first passage portion 62, it will be understood that the exhaust outlet could communicate with the folded passage 58 at any convenient point. It will also be understood that while the exhaust is shown as being discharged through the propeller hub 51, the exhaust could be discharged in any conventional manner.

Furthermore, while in the illustrated construction the end walls 82 and 90 are shown as being planar, in other constructions these end walls could be curved to provide a smooth continuous connection between passage portions 62 and 72 and between passage portions 72 and 74.

Various features of the invention are set forth in the following claims.

We claim:

1. An outboard motor comprising a power head including an engine having an exhaust gas port, a drive shaft housing extending downwardly from said power head and including a lower end, a drive shaft driven by said engine, an exhaust gas discharge outlet adjacent said lower end, means defining a continuous folded passage housed in said drive shaft housing and including a first passage portion extending generally parallel to said drive shaft, having an upper end communicating with said exhaust gas port, and having a lower end, a second passage portion extending generally parallel to said drive shaft, communicating with said lower end of said first portion and extending upwardly therefrom, and having an upper end, and a third portion communicating with said upper end of said second portion and extending downwardly therefrom and including a transverse end wall closing the end thereof, said folded passage also communicating with said exhaust gas discharge outlet, and a propeller supported for rotation by said lower end of said drive shaft housing and drivingly connected to said drive shaft.

2. An outboard motor as set forth in claim 1 wherein at least a portion of said third passage portion has a cross section which decreases in a direction toward said transverse end wall.

3. An outboard motor as set forth in claim 1 wherein said first portion terminates in a lower end wall transverse to said drive shaft, said transverse lower end wall having an exhaust opening therein communicating with said exhaust gas discharge outlet.

4. An outboard motor as set forth in claim 1 wherein said first passage portion provides for exhaust flow in a first direction away from the exhaust gas port and wherein said second passage portion provides for propagation of pressure pulses in a direction opposite said first direction.

5. An outboard motor as set forth in claim 1 wherein said first passage portion has a lower end having an increasing cross sectional area in the direction away from said exhaust port, wherein said second portion has an increasing cross sectional area in the direction toward said second portion upper end, wherein said third portion extends downwardly from said second portion upper end, and wherein said third portion has a decreasing cross sectional area in the direction away from said upper end of said second portion.

6. An outboard motor comprising a power head including an engine block, a piston reciprocably movably carried in said block, a cylinder head carried on said block and defining in conjunction with said piston a combustion chamber, an exhaust port communicating with said combustion chamber and being disposed to be closed by said piston, a lower unit extending downwardly from said power head and including a lower end, a drive shaft driven by said engine, an exhaust gas discharge outlet adjacent said lower end, means defining a folded passage housed in said lower unit and extending from said exhaust gas port to said exhaust gas discharge outlet, said means defining a folded passage including means for returning to said exhaust port, as pressure pulses, the pressure pulses traveling in said folded passage and for causing a return of the pressure pulses in relation to the closing of said exhaust port to afford arrival of the pressue pulses at said exhaust port prior to the closing of said exhaust port by said piston, said folded passage including a first portion extending parallel to said drive shaft, having an upper end communicating with said exhaust gas port, and a lower end communicating with said exhaust gas discharge outlet, a second portion extending parallel to said drive shaft, communicating with said lower end of said first portion, and having an upper end, and a third portion communicating with said upper end of said second portion and extending downwardly therefrom, said third portion terminating in a transverse end wall closing the end of said third portion, and a propeller supported for rotation on said lower end of said lower unit and drivingly connected to said drive shaft.

7. An outboard motor as set forth in claim 6 wherein said third portion decreases in cross sectional area in the direction toward said transverse end wall.

8. An outboard motor as set forth in claim 6 wherein said first portion terminates in a transverse lower end wall having an opening therein, and wherein said exhaust gas discharge outlet communicates with said opening.

9. An outboard motor as set forth in claim 6 wherein said first portion has a lower end having an increasing cross sectional area in the direction away from said exhaust port, and said second portion has an increasing cross sectional area in the direction toward said second portion upper end whereby said first portion lower end and said second portion form a passage segment which has a cross section which substantially continuously increases as the distance from the exhaust port increases, and wherein said third portion has a decreasing cross sectional area in the direction toward said transverse end wall.

10. An outboard motor comprising a power head including an engine having an exhaust gas port, a drive shaft housing extending downwardly from said power head and including a lower end, a drive shaft driven by said engine, an exhaust gas discharge outlet adjacent said lower end, means defining a continuous folded passage housed in said drive shaft housing and including a first passage portion having an upper end communicating with said exhaust gas port and having a lower end, a second passage portion communicating with said lower end of said first portion, extending upwardly therefrom, and having an upper end, and a third passage portion communicating with said upper end of said second portion, extending downwardly therefrom, and terminating in a transverse end wall closing the end of said third portion and located intermediate said lower end of said first passage portion and said upper end of said second passage portion, said folded passage also communicating with said exhaust gas discharge outlet, and a propeller supported for rotation by said lower end of said drive shaft housing and drivingly connected to said drive shaft.

11. An outboard motor comprising a power head including an engine having an exhaust gas port, a drive shaft housing extending downwardly from said power head and including a lower end, a drive shaft driven by said engine, an exhaust gas discharge outlet adjacent said lower end, means defining a continuous folded passage housed in said drive shaft housing and including a first passage portion having an upper end communicating with said exhaust gas port and having a lower end, a second passage portion communicating with said lower end of said first portion, extending upwardly therefrom, and having an upper end, and a third passage portion communicating with said upper end of said second portion, extending downwardly therefrom, and terminating in a transverse end wall located intermediate said lower end of said first passage portion and said upper end of said second passage portion, and at least a portion of said third passage having a cross section which decreases in a direction toward said transverse end wall, said folded passage also communicating with said exhaust gas discharge outlet, and a propeller supported for rotation by said lower end of said drive shaft housing and drivingly connected to said drive shaft.

12. An outboard motor as set forth in claim 10 wherein said first portion terminates in a transverse lower end wall, said transverse lower end wall having an exhaust opening therein communicating with said exhaust gas discharge outlet.

13. An outboard motor as set forth in claim 10 wherein said first passage portion provides for exhaust flow in a first direction away from said exhaust gas port, and wherein said second passage portion provides for propagation of pressure pulses in a direction opposite said first direction.

14. An outboard motor as set forth in claim 10 wherein said first passage portion has a lower end having an increasing cross sectional area in the direction away from said exhaust port, wherein said second portion has an increasing cross sectional area in the direction toward said second portion upper end and wherein said third portion has a decreasing cross sectional area in the direction away from said upper end of said second portion.

15. An outboard motor comprising a power head including an engine block, a piston reciprocably movably carried in said block, a cylinder head carried on said block and defining in conjunction with said piston a combustion chamber, an exhaust port communicating with said combustion chamber and being disposed to be closed by said piston, a lower unit extending downwardly from said power head and including a lower end, an exhaust gas discharge outlet adjacent said lower end, means defining a folded passage housed in said lower unit and extending from said exhaust gas port to said exhaust gas discharge outlet, said means defining a folded passage including means for returning to said exhaust port, as pressure pulses, the pressure pulses traveling in said folded passage and for causing a return of the pressure pulses in relation to the closing of said exhaust port to afford arrival of the pressure pulses at said exhaust port prior to the closing of said exhaust port by said piston, said folded passage including a first portion having an upper end communicating with said exhaust gas port and a lower end communicating with said exhaust gas discharge outlet, a second portion communicating with said lower end of said first portion, said second portion having an upper end, and a third portion communicating with said upper end of said second portion, said third portion terminating in an end wall which is transverse to said first and second portions and which is located below said upper end of said second passage portion and above said lower end of said first passage portion, and a propeller supported for rotation on said lower end of said lower unit.

16. An outboard motor as set forth in claim 15 wherein said third portion decreases in cross sectional area in the direction toward said transverse end wall.

17. An outboard motor as set forth in claim 15 wherein said first portion terminates in a transverse lower end wall having an opening therein, and wherein said exhaust gas discharge outlet communicates with said opening.

18. An outboard motor as set forth in claim 15 wherein said first portion has a lower end having an increasing cross sectional area in the direction away from said exhaust port, and said second portion has an increasing cross sectional area in the direction toward said second portion upper end, whereby said first portion lower end and said second portion form a passage segment which has a cross section which substantially continuously increases as the distance from the exhaust port increases, and wherein said third portion has a decreasing cross sectional area in the direction toward said transverse end wall.

* * * * *